(12) United States Patent
Liao (10) Patent No.: US 7,061,151 B2
(45) Date of Patent: Jun. 13, 2006

(54) SUPPORTING DEVICE OF ROTOR (76) Inventor: Wen-Shyong Liao, 5th Fl., Alley 59, Lane 14, Sec. 7, Chung Shang North Road, Taipei (TW)

( * ) Notice: Subject to any disclaimer, the term of this patent is extended or adjusted under 35 U.S.C. 154(b) by 0 days.

(21) Appl. No.: 09/812,326

(22) Filed: Mar. 20, 2001

(65) Prior Publication Data

US 2002/0135247 A1    Sep. 26, 2002

(51) Int. Cl.
*H02K 5/16*    (2006.01)
(52) U.S. Cl. .................. 310/90; 310/67 R; 310/75 D; 384/100
(58) Field of Classification Search .................. 310/90, 310/75 D, 67 R; 384/100, 107, 114, 375, 384/385, 11
See application file for complete search history.

(56) References Cited

U.S. PATENT DOCUMENTS

| 4,007,390 | A | * | 2/1977 | Muller et al. .......... 310/156.34 |
| 4,865,922 | A | * | 9/1989 | Davies ........................ 384/910 |
| 5,763,344 | A | * | 6/1998 | Komatsu .................... 264/681 |
| 5,791,784 | A | * | 8/1998 | Ichiyama .................... 384/107 |
| 5,874,793 | A | * | 2/1999 | Kuwayama et al. .......... 310/90 |
| 5,938,343 | A | * | 8/1999 | Grantz et al. ............... 384/100 |
| 5,998,898 | A | * | 12/1999 | Fukutani et al. .............. 310/90 |
| 6,712,513 | B1 | * | 3/2004 | Tanaka et al. .............. 384/100 |

* cited by examiner

*Primary Examiner*—Dang Le
(74) *Attorney, Agent, or Firm*—Birch, Stewart, Kolasch & Birch, LLP (57) ABSTRACT

A supporting device of a rotor includes a ceramic axial tube fixed on the rotor, and a ceramic axial support rotationally supporting the ceramic axial tube, wherein the spacing between the ceramic axial tube and the ceramic axial support is within the range of 2–25 μm so as to prevent shaking and reduce noise. The ceramic axial tube formed as a hollow tube is allowed to store lubricants within the inner space of the tube, and further reduce frictional noise and heat production. In addition, the ceramic axial rube formed as a hollow tube is also advantageous for binding with the fan body during the molding process of the fan rotor.

7 Claims, 14 Drawing Sheets

SUPPORTING DEVICE OF ROTOR

BACKGROUND OF THE INVENTION

1. Field of the Invention

The present invention relates to supporting devices of rotors and more particularly, to a supporting device used for supporting a rotor of an apparatus such as a heat-dissipation fan.

2. Description of Prior Art

Figure 1:
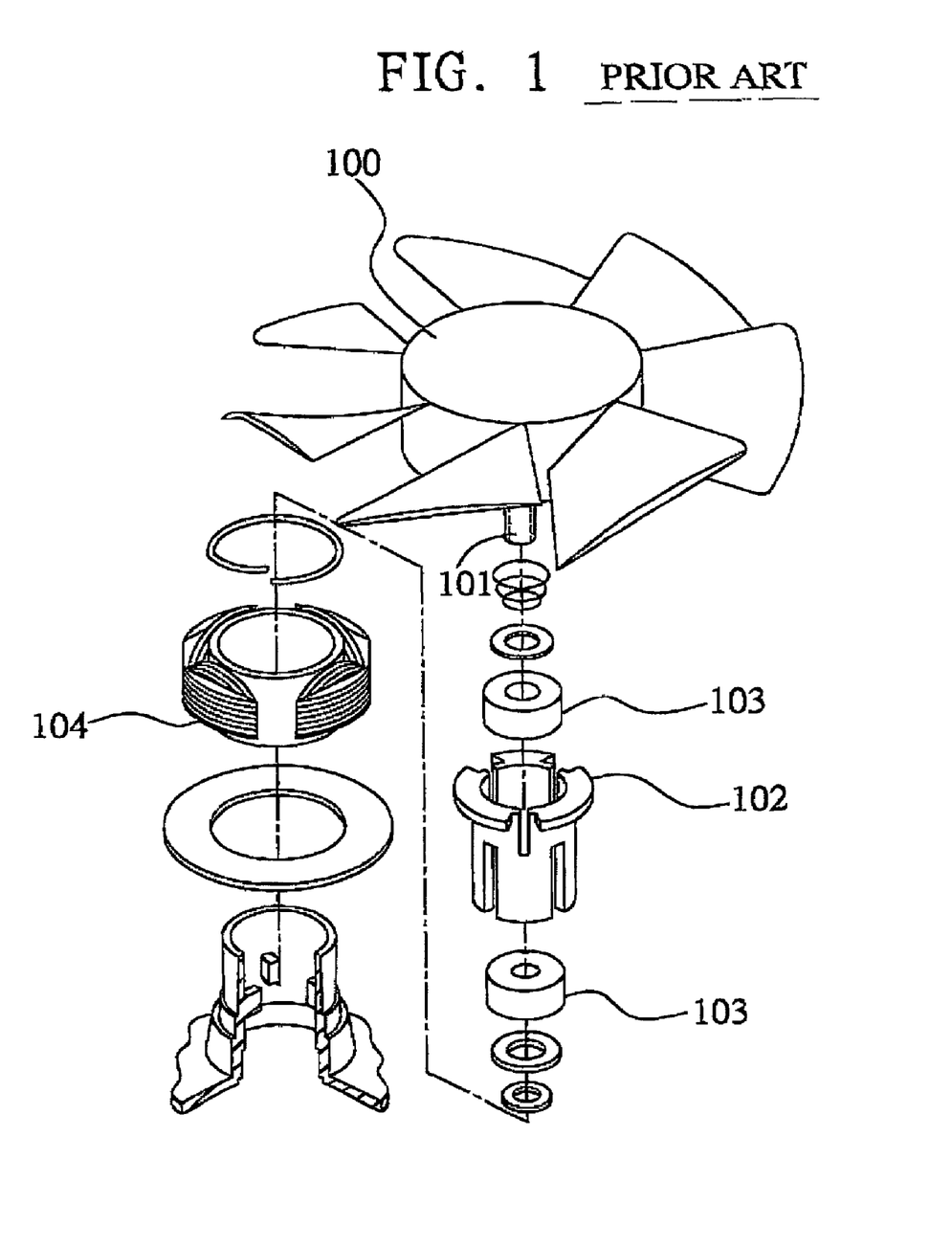
FIG. 1 (PRIOR ART) is a schematic exploded diagram of a conventional heat-dissipation fan.

FIG. 1 is a schematic exploded diagram of a conventional heat-dissipation fan, wherein a rotation shaft 101 of a fan body 100 is supported by a pair of axial bearings 103 fitted into two ends of a sleeve 102, and is rotated by a ring magnet (not shown) fitted on the inner surface of the fan body 100 repelled by a magnetic force generated by a coil 104 coupled to the fan body 100.

In order to cooperate with the axial begs 103, the rotation shaft 101 is usually made of a sintered metal, and requires delicate processing. However, the fan body 100 is usually formed by usually made of plastics and is generated in manufacturing small fans often due to the very thin wall of the fan body 100.

In addition, lubrication between the rotation shaft 101 and the axial bearings 103 is reduced by the effect of consumed lubricants due to easily heat production during the fan rotating at high speed for long time, which also causes damage and deformation by the heat to the rotation shaft 101 and the axial bearings 105 later on, and which generates shaking and noise, and shortens the usage life of the fan. Therefore, defects of being labile to high temperature, being labile to abrasion, easily generating shaking and noise, and having a short usage life may be concluded.

In order to improve the above defects of a conventional heat-dissipation fan, "Improved stature of fan motor" as stated in Chinese Patent Publication No. 285375 discloses a rotational device comprising a ceramic axial sleeve and a ceramic axis inserted in said sleeve, with defined sure roughness for the axial sleeve and the axis. Addition of lubricants is still required for the axial sleeve and the axis of the "Improved structure of fan motor" to reduce frictional noise and heat production. Also, said patent defines only the surface roughness of the axial sleeve and the axis, but not the corresponding spacing between the axial sleeve and the axis. According to experiments proceeded by the inventor of the invention it has been found that even if completely following the defined surface roughness for making the axial sleeve and the axis shaking and noise will still be generated if the corresponding spacing between the axial sleeve and the axis is too big. In addition, the solid ceramic axis of said patent is brittle and is not easily fixed on the fan body in manufacturing small fans due to the very thin wall of the fan body

SUMMARY OF THE INVENTION

The present invention is accomplished in order to improve the defects disclosed in prior arts. It is therefore an objective of the invention to provide a rotor's supporting device with high mechanical strength, a long usage life, tolerance to high temperature, tolerance to abrasion, and low noise generation.

It is another objective of the invention to provide a rotor's supporting device with self-supply of lubricants to reduce frictional noise and heat production.

It is still another objective of the invention to provide a rotor's supporting device, which is used in a heat-dissipation fan, and is advantageous for fixing the rotation shaft of the rotor on the fan body of the fan in manufacturing small fans.

In order to achieve above objectives, the invention provides a rotor's supporting device which comprises: a ceramic axial tube which is a hollow tube with one end opening attached to and closed by the rotor, and the other end opening seated by a lid to form an internal space for storing lubricants within the axial tube; at least one ceramic axial support used to rotationally support the axial tube; and a permeable structure formed on the axial tube to allow the lubricant leaking out from the axial tube.

The ceramic axial tube is formed as a hollow tube with higher mechanical strength and with an advantage for connecting with the fan body of the fan, for example, during the molding process of forming the fan body, the axial tube may be pre-embedded into the mold, and partial plastics flow into and seal one end opening of the axial tube for strong fixation. The lid used to seal the other end opening of the axial tube restricts the axial movement of the axial tube.

In order to reduce frictional noise and heat production, it may make use of the internal space within the above axial tube with two end sealed for storing lubricants. The axial tube may also be formed with permeable structures e.g. thin slots or tiny holes to allow the lubricant leaking out automatically to lubricate the opposing rotating surfaces of the axial tube and the ceramic axial support when the axial tube is rotating against the axial support.

In addition, in order to prevent the corresponding spacing between the axial tube and the axial support from being too big to cause shaking and noise for the axial tube when rotating, the inventor of the invention has found by many experiments that: quite good effects of anti-shaking and anti-noise can be obtained by controlling the spacing between the rotational contact surfaces of the rotation shaft and the axial support made of ceramics to be within the range of 2–25 µm, and most preferred effects are shown when the spacing is between 2–25 µm. Also, the spacing of 2–25 µm may impede the loss of the lubricant and prolong the usable period of lubricants within the axial tube.

Furthermore, the storage of lubricants within the axial tube and the permeable structures formed on the axial tube to allow the lubricant lecking out from the axial tube of the invention can also be replaced simply by altering the shape or structure of the axial tube or the axial support to form a lubricant storage space, for example, a concave formed in the middle part of the axial tube or the axial support allows a ring or other shaped space formed between the axial tube and the axial support, or a ceramic axial support with a plurality of interval structures is used to support the axial tube and allow the formation of a ring space between the axial support and the sleeve, etc.

Further, the above lubricant is preferred to be a fluoride-containing lubricant with a particle diameter smaller than 1 µm.

In addition, the lubricant storage within the axial tube or the storage space formed between the axial tube and the axial support may not be necessary if reducing the contact surface between the axial tube and the axial support and reducing the frictional resistance thereof. Smooth rotation between the axial tube and the axial support can also be achieved by only controlling the roughness of the contact surface between the axial tube and the axial support and the rotational corresponding spacing thereof. Also, since there is no concern for a pollution caused by using lubricants, therefore it is particularly suitable for applications in informational electronic products, e.g. the rotation shaft of a hard disc machine or a CD ROM machine.

There is no particular limitation on the method for reducing the contact surface between the axial tube and the axial support, as long as it makes either the outer circumference surface of the axial tube or the inner circumference surface of the axial support become a non-cylindrical surface. The inventor of the invention has found by experiments that the axial sectional view of the outer circumference surface of the axial tube is formed as an equivalent multi-angular non-cylindrical shape by cutting off a plurality of equally long arcs at equal intervals along the axial direction from the outer surface of the axial tube, the axial sectional view of the inner circumference surface of the axial support is formed as a flower-like non-cylindrical shape by cutting the inner surface of the axial support to form a plurality of equally wide concaves at equal intervals; which allow the axial tube to be contacted with the axial support only by small contact surfaces at equal intervals along the circumference direction, and then most smooth rotation with lowest noise generated may occur between the axial tube and the axial support in the absence of lubricants.

In the above examples of various supporting devices of the rotor of the invention, there is no restriction on the manufacturing process of the axial tube and the axial support. However, if following the process below for producing the axial tube and the axial support, it gives the best results on raising the mechanical strength, the usage life, tolerance to high temperature and tolerance to abrasion, and reducing noise. That is, ceramic powders of a metal oxide, e.g. aluminum oxide, zirconium oxide, silicon oxide, etc., or of a mixture of two or more foregoing oxides are used and uniformly formulated with a plastic agent, an assisting agent and a dispersing agent according to a certain ratio. After molding, defat at a low temperature and then sinter at a high temperature to produce a ceramic rough embryo with high mechanical strength, tolerance to high temperature and tolerance to abrasion. After shaping into circles and doing holes for the ceramic rough embryo to become a pro-ceramic axial tube and a pro-ceramic axial support, delicate grinding is processed to maintain the real-circularity for and the proper spacing between the outer surface of the ceramic axial tube and the inner surface of the ceramic axial support.

BRIEF DESCRIPTION OF DRAWINGS

The supporting device of a rotor of the invention can be fully understood by reading the following detailed description of the preferred embodiments, with reference made to the accompanying drawings, wherein.

DETAILED DESCRIPTION OF PREFERRED EMBODIMENTS

Figure 2:
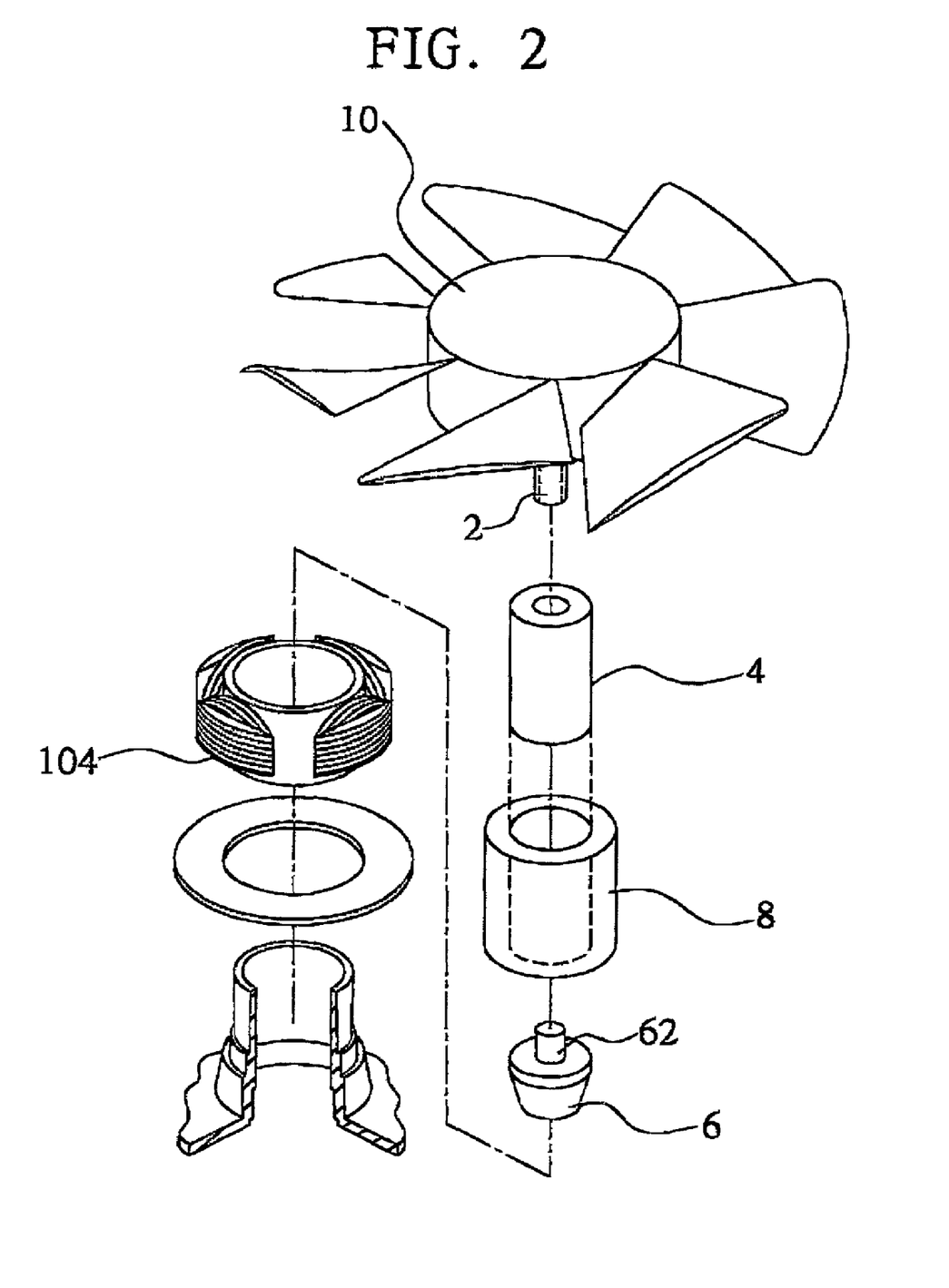
FIG. 2 is a schematic exploded diagram of one example of the supporting device of a rotor of the invention used in a heat-dissipation fan.

FIG. 2 is a schematic stereogram for one example of the supporting device of a rotor of the invention used in a heat-dissipation fan, wherein a ceramic axial tube 2 is a hollow tube, which is inserted into and rotationally supported by a hollow cylindrical ceramic axial support 4. One end of the ceramic axial tube 2 is strongly fixed on the interior surface of a cap-shaped fan body 10 having propeller blades (see FIG. 4), which allows the axial tube 2 and the fan body 10 rotating in an unity relatively to the axial support 4; the other end of the axial tube 2 is fitted with a lid 6 to cover the opening and to impede the axial movement of the axial tube 2. Finally, the axial support 4 is closely surrounded at outside by a sleeve 8. Other parts and rotation mechanisms of the fan body 10 in FIG. 2, which are same as those described in the foregoing prior art in FIG. 1, are not mentioned herein.

Figure 3:
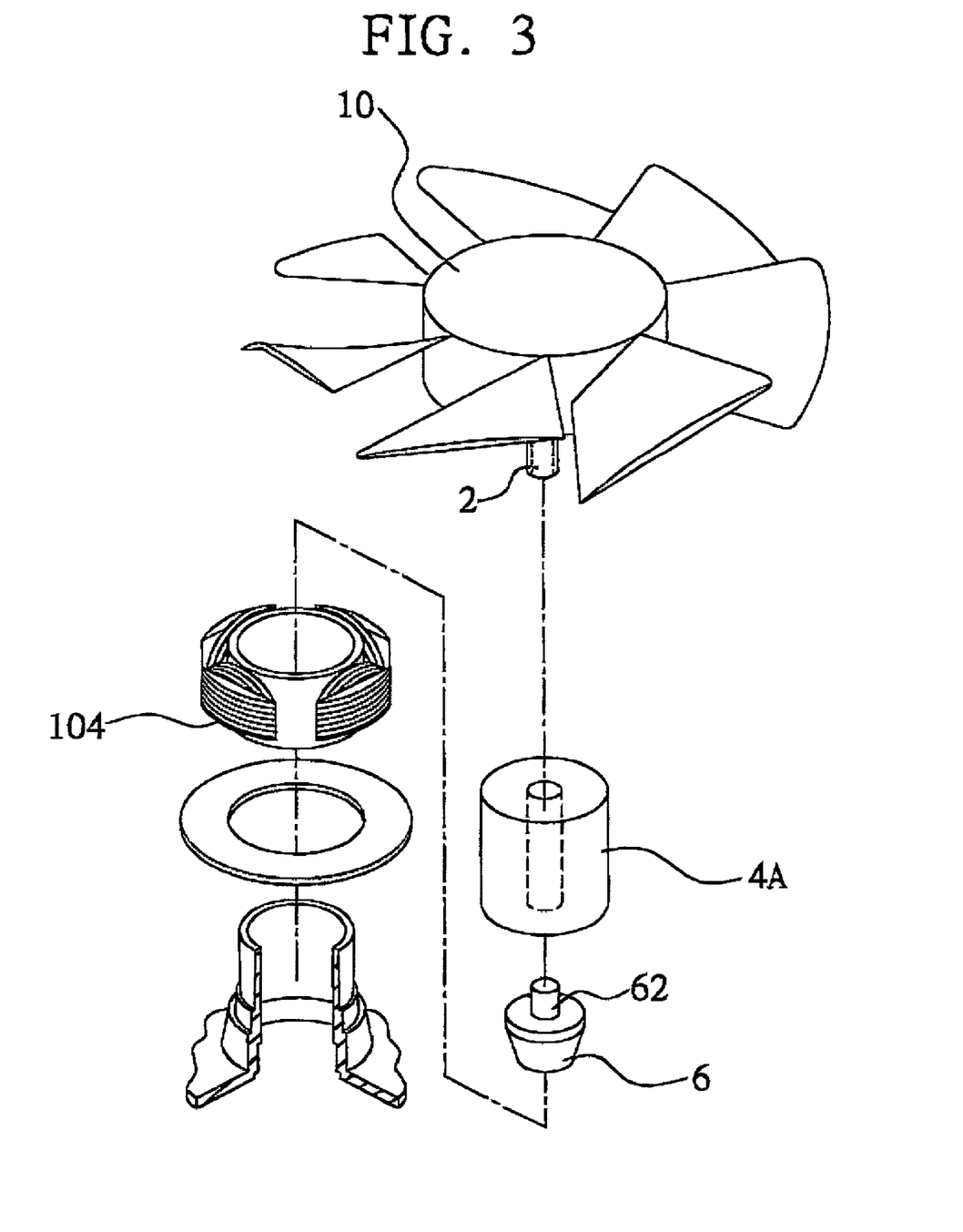
FIG. 3 is a schematic stereogram of another example of the supporting device of a rotor of the invention used in a heat-dissipation fan.

Referring to FIG. 2, the sleeve 8 is used for closely surrounding the outside of the axial support 4. However, also referring to FIG. 3, the sleeve 8 may not be required if to enlarge the diametrical thickness of the axial support 4, and to insert the axial support 4 directly into the coil stand fitted with coils 104.

Figure 4:
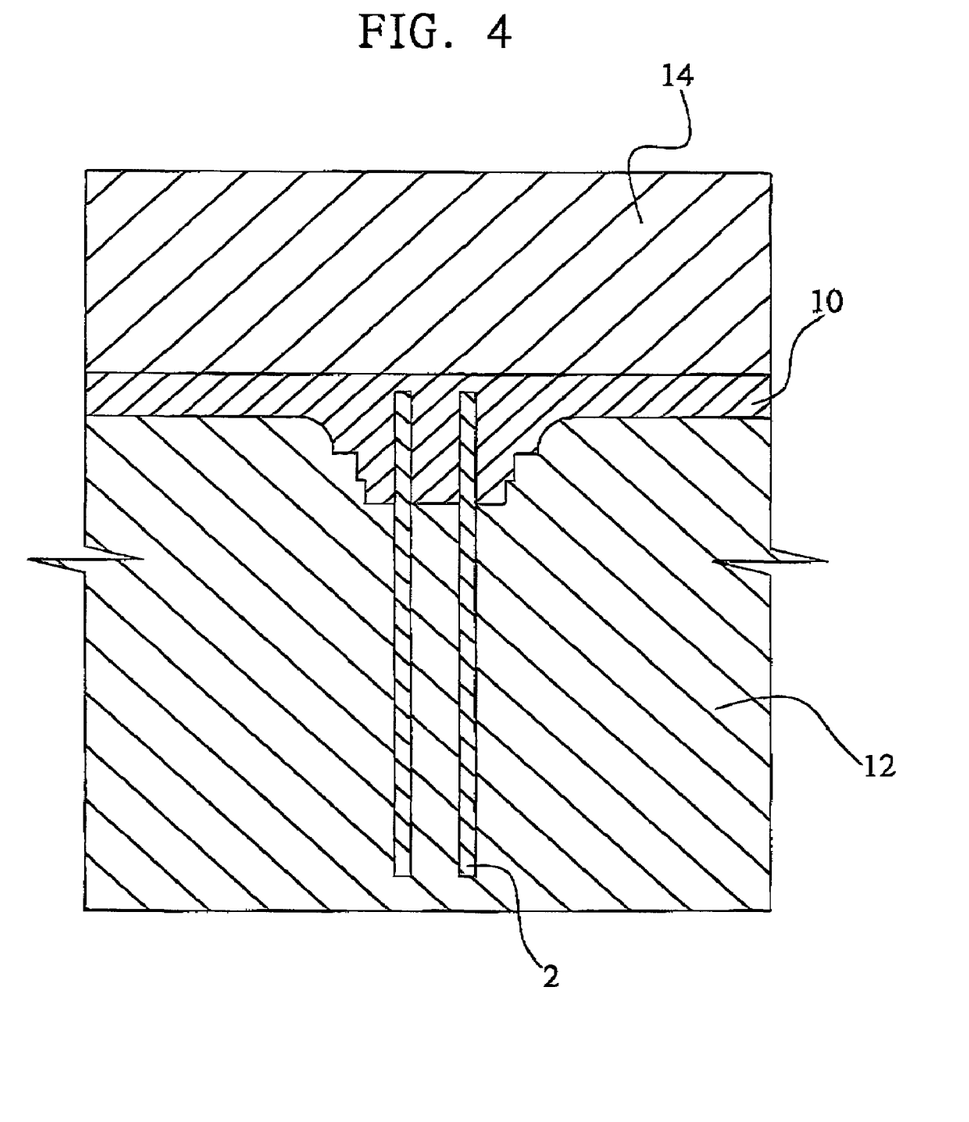
FIG. 4 is a schematic sectional diagram of the one-shaped formation of pre-embedded ceramic axial tube of the invention and the fan.

Referring to FIG. 4, the strong binding between the axial tube 2 and the fan body 10 may be formed, even in manufacturing small heat-dissipation fans with very thin fan walls, by pre-embedding the axial tube 12 into a father model 12, which is concave around one end of the axial tube 2, and by filling in the end opening of the axial tube 2 with partial materials of the fix body 10 between the father model 12 and a mother model 14 during the molding process.

Figure 5A:
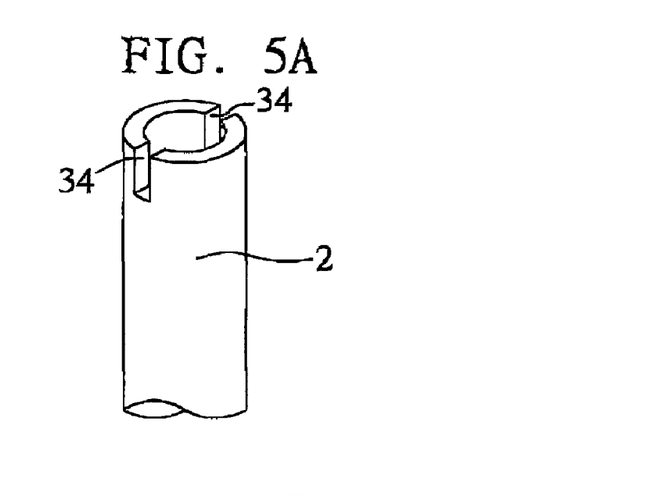
FIG. 5A is schematic exploded diagram of one example of one end of the ceramic axial tube.
Figure 5B:
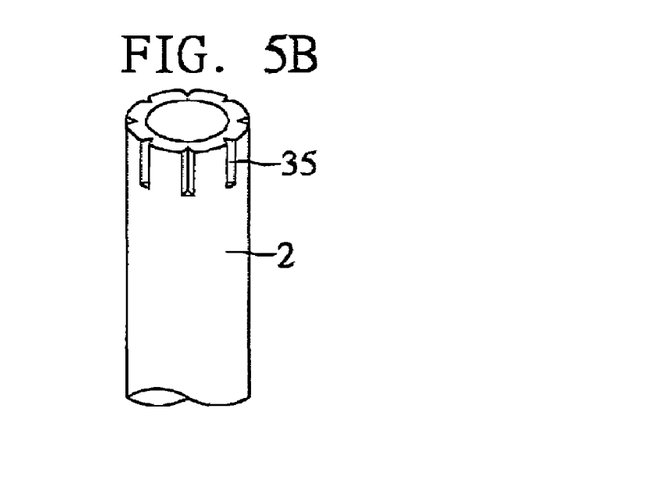
FIG. 5B is schematic exploded diagram of another example of one end of the ceramic axial tube.
Figure 5C:
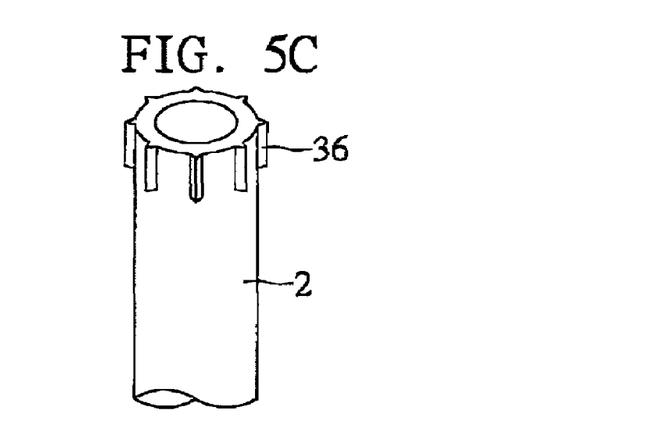
FIG. 5C is schematic exploded diagram of still another example of one end of the ceramic axial tube.

In addition, referring to FIGS. 5A–5C, the connecting end of the axial tube 2 with the fan body 10 is formed in gaps, protrusions or concaves to allow more strong binding between the axial tube 2 and the fan body 10. In FIG. 5A, the end of the axial tube 2 is formed with two chelating gaps 34; in FIG. 5B, the outer surface of the axial tube 2 is formed with a plurality of equal-distantly distributed axial chelating concaves 35; in FIG. 5C, the outer surface of the axial tube 2 is formed with a plurality of equal-distantly distributed axial chelating protrusions 36.

Figure 6:
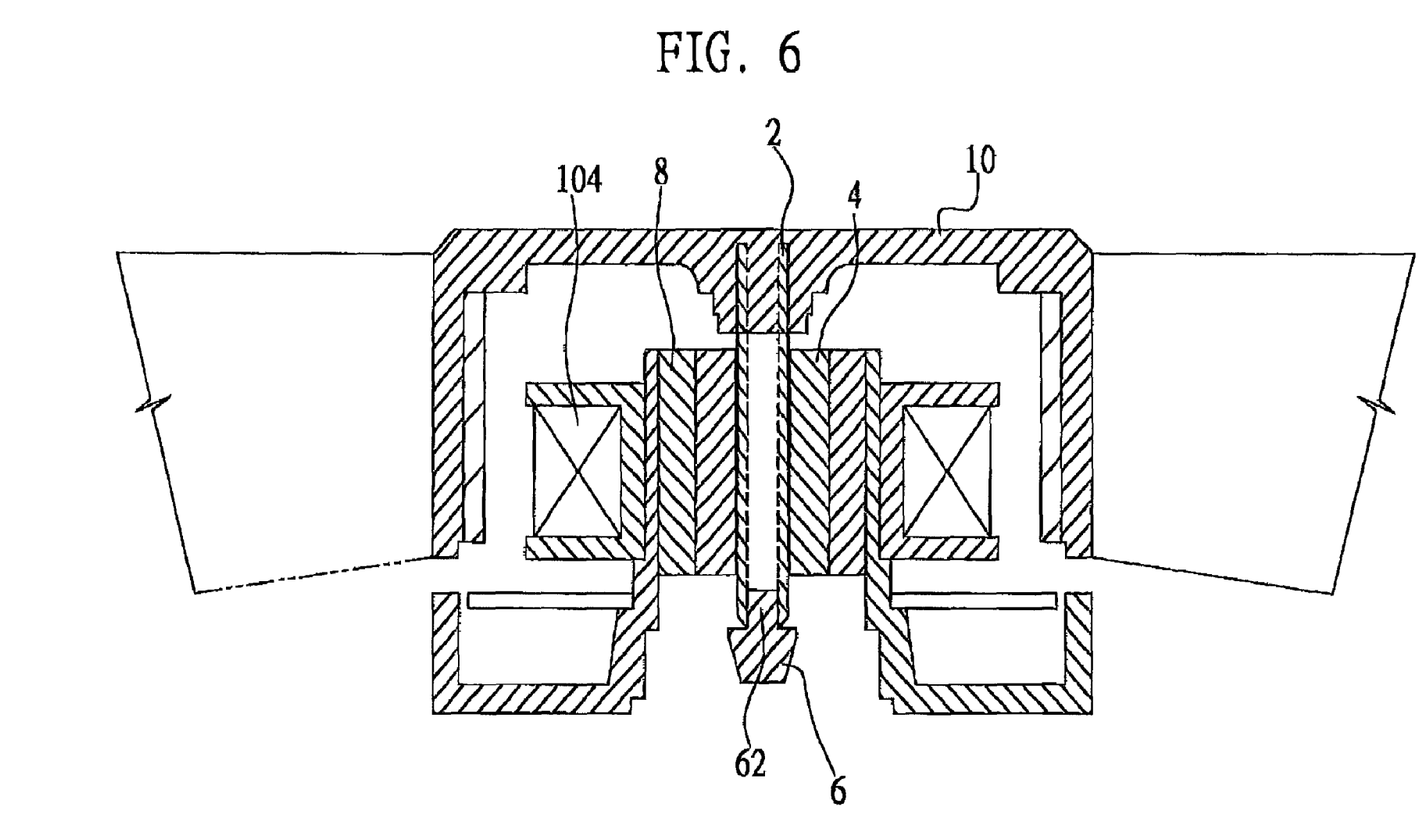
FIG. 6 is a schematic sectional diagram of the supporting device of a rotor of the invention used in a heat-dissipation fan.

FIG. 6 is a schematic sectional diagram of the supporting device of a rotor of the invention used in a heat-dissipation fan, wherein it further shows the connecting relationship between the fan body 10, the ceramic axial tube 2, the ceramic axial support 4, the lid 6 and the sleeve 8. One end of the axial tube 2 is sealed by bound to the fan body 10, and the other end is sealed by covered with the lid 6. The lid 6 having a protrusion 62 is made of materials e.g. metals or rubbers, etc., and the protrusion 62 is tightly inserted into the other end of the axial tube 2 to close the end opening. In addition, the lid 6 has a diameter larger that of the axial tube 2 so as to restrict the axial movement of the axial tube 2 and to prevent the axial tube 2 falling from the axial support 4.

There is no particular restriction on the manufacturing process for the ceramic axial tube 2 and the ceramic axial support 4 of the supporting device of a rotor of the invention. This preferred embodiment is using ceramic powders of a metal oxide, e.g. aluminum oxide, zirconium oxide, silicon oxide, etc., or of a mixture of two or more foregoing oxides are used and uniformly formulated with a plastic agent, an assisting agent and a dispersing agent according to a certain ratio. After molding, defat at a low temperature and then sinter at a high temperature to produce a ceramic rough embryo with high mechanical strength, tolerance to high temperature and tolerance to abrasion. After shaping into circles and doing holes for the ceramic rough embryo to become a pro-ceramic axial tube and a pro-ceramic axial support, delicate grinding is processed to maintain the real-circularity for and the proper spacing between the outer surface of the ceramic axial tube and the inner surface of the ceramic axial support so as to maintain a stable, low-shaking and low-noise rotation of the ceramic axial tube 2. In this preferred embodiment, the proper spacing between the outside surface of the axial tube 2 and the inside surface of the axial support 4 is within the range of 2–25 µm.

The foregoing is the exemplary embodiment of the supporting device of a rotor of the invention. Various alternative examples of the exemplary embodiment are described below in details with reference made to accompanying drawings.

FIRST ALTERNATIVE EXAMPLE

Figure 7:
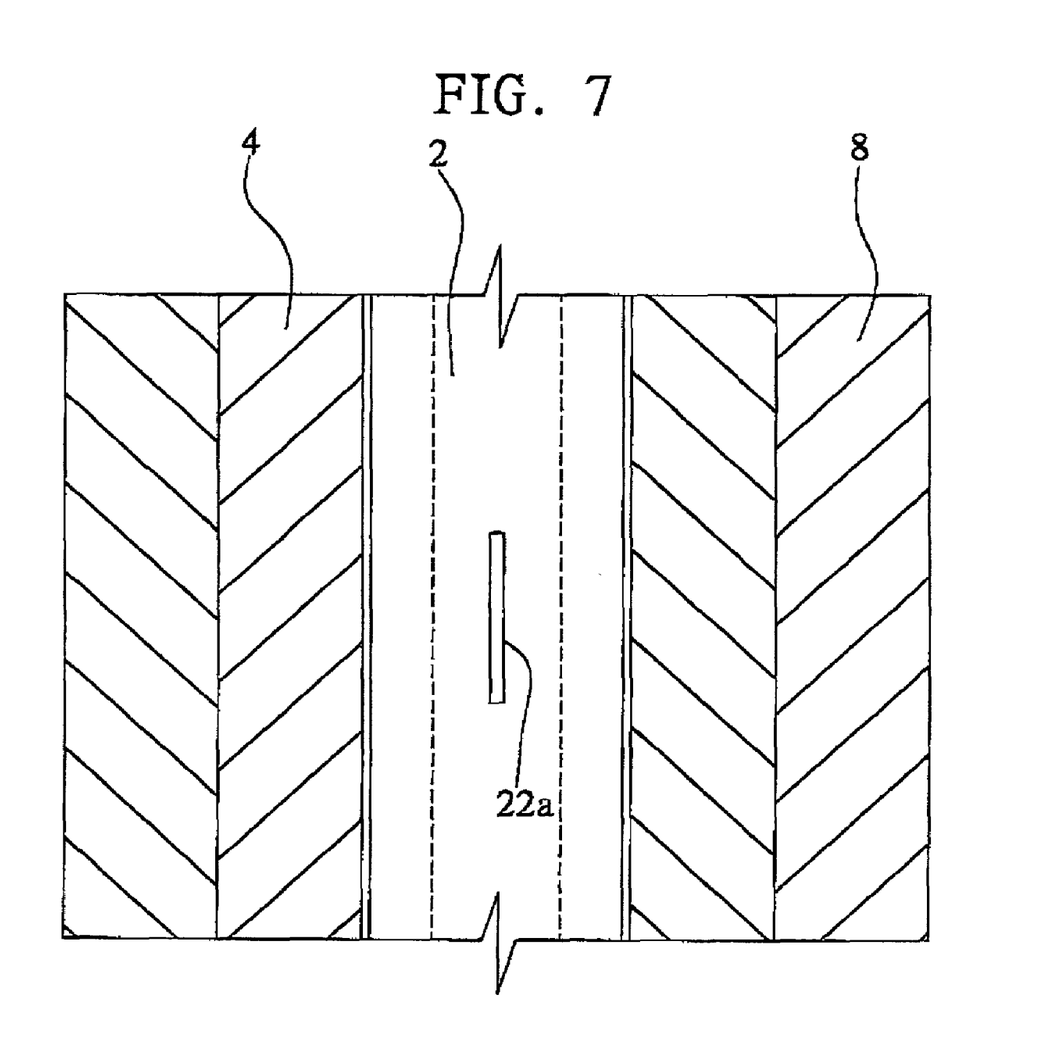
FIG. 7 is a schematic sectional diagram of the supporting device of a rotor according to the first alternative example of the invention.

As described above, a space for storing lubricants can be formed within the ceramic axial tube 2 by the hollow tube of the axial tube 2 with its two end openings sealed by the fan body 10 and the lid 6, respectively. Referring to FIG. 7, the axial tube 2 is formed through the wall with at least one thin slot 22a (only one is shown herein), which permits lubricants self-leaking from the axial tube 2 so as to lubricate the opposing rotating surfaces of the axial tube 2 and the ceramic axial support 4, and to reduce frictional noise and heat production when the axial tube 2 is rotating against the axial support 4.

When sealing the end opening of the ceramic axial tube 2 by the lid 6, a sealing adhesive may be applied to or a sealing ring may be fitted between the lid 6 and the axial tube 2 to prevent linkage of lubricants.

SECOND ALTERNATIVE EXAMPLE

Figure 8:
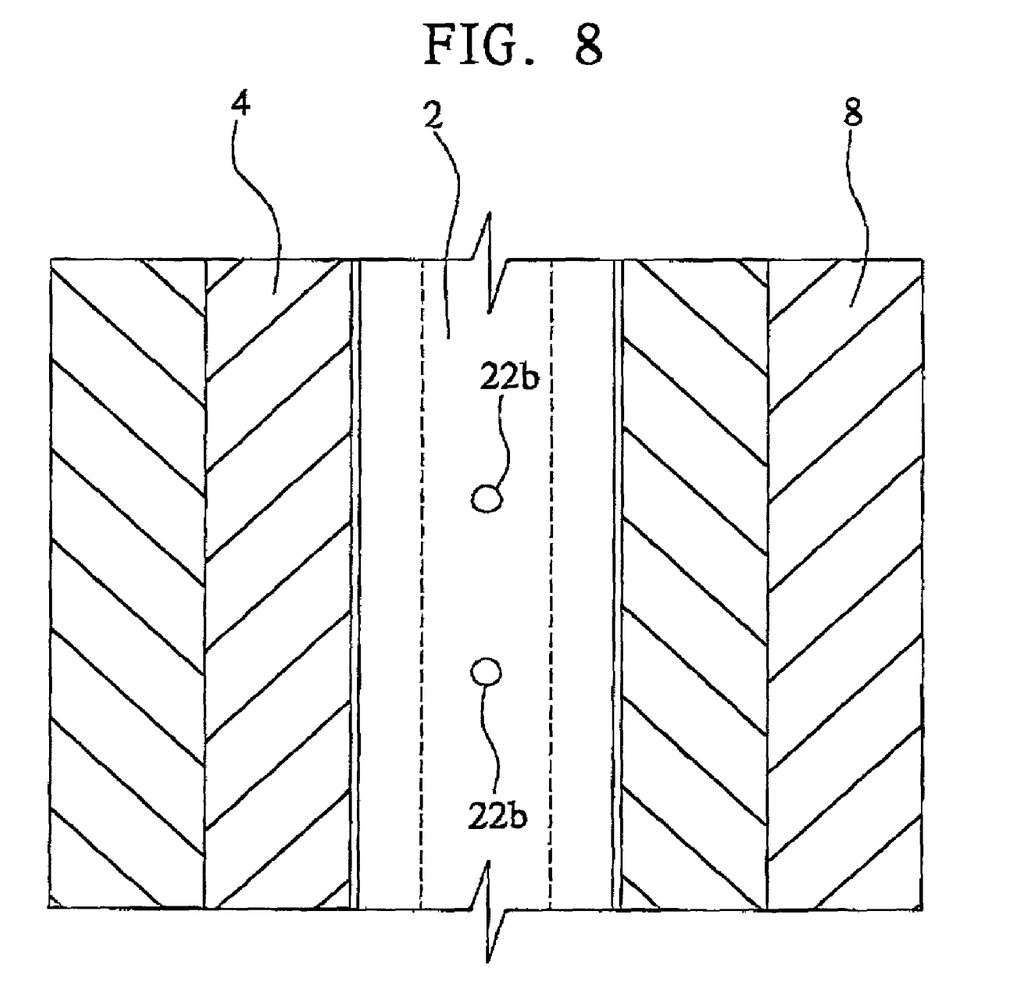
FIG. 8 is a schematic sectional diagram of the supporting device of a rotor according to the second alternative example of the invention.

Alternatively, referring to FIG. 8, the ceramic axial tube 2 is formed through the wall with a plurality of circular holes 22b (two are shown herein), which permits lubricants self-leaking from the axial tube 2 so as to lubricate the opposing rotating surfaces of the axial tube 2 and the ceramic axial support 4 when the axial tube 2 is rotating against the axial support 4. This alternative example has same effects as the first alternative example on reducing frictional noise and heat production.

THIRD ALTERNATIVE EXAMPLE

Figure 9:
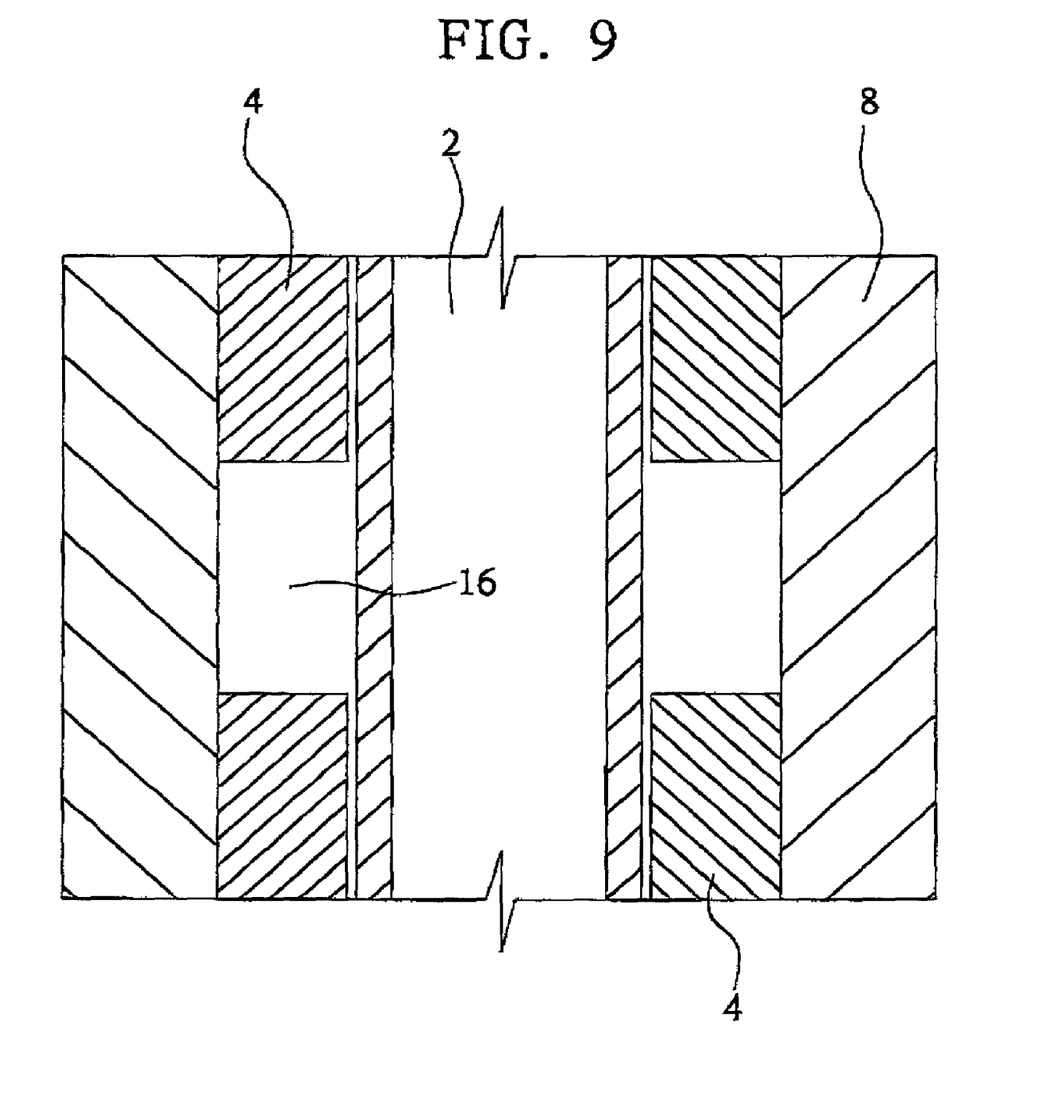
FIG. 9 is a schematic sectional diagram of the supporting device of a rotor according to the third alternative example of the invention.

FIG. 9 is a schematic sectional diagram of the supporting device of a rotor according to the third alternative example of the invention, wherein a ring space 16 for storing lubricants is formed between two ceramic axial supports 4, which support the ceramic axial tube 2 and are tightly fitted within the sleeve (supporting body) 8, and the sleeve 8. In addition to reducing frictional noise and heat production by the effort of lubricants to lubricate the opposing rotating surfaces of the axial tube 2 and the axial support 4, this alternative example also has effects on reducing frictional surface area and energy consumption.

It is not limited to using two ceramic axial supports 4 as exemplified above, but it may be axially fit more than two ceramic axial supports along the ceramic axial tube 2, for example, three ceramic axial supports are embedded at equal intervals within the sleeve 8 to form two ring spaces for storing lubricants.

FOURTH ALTERNATIVE EXAMPLE

Figure 10:
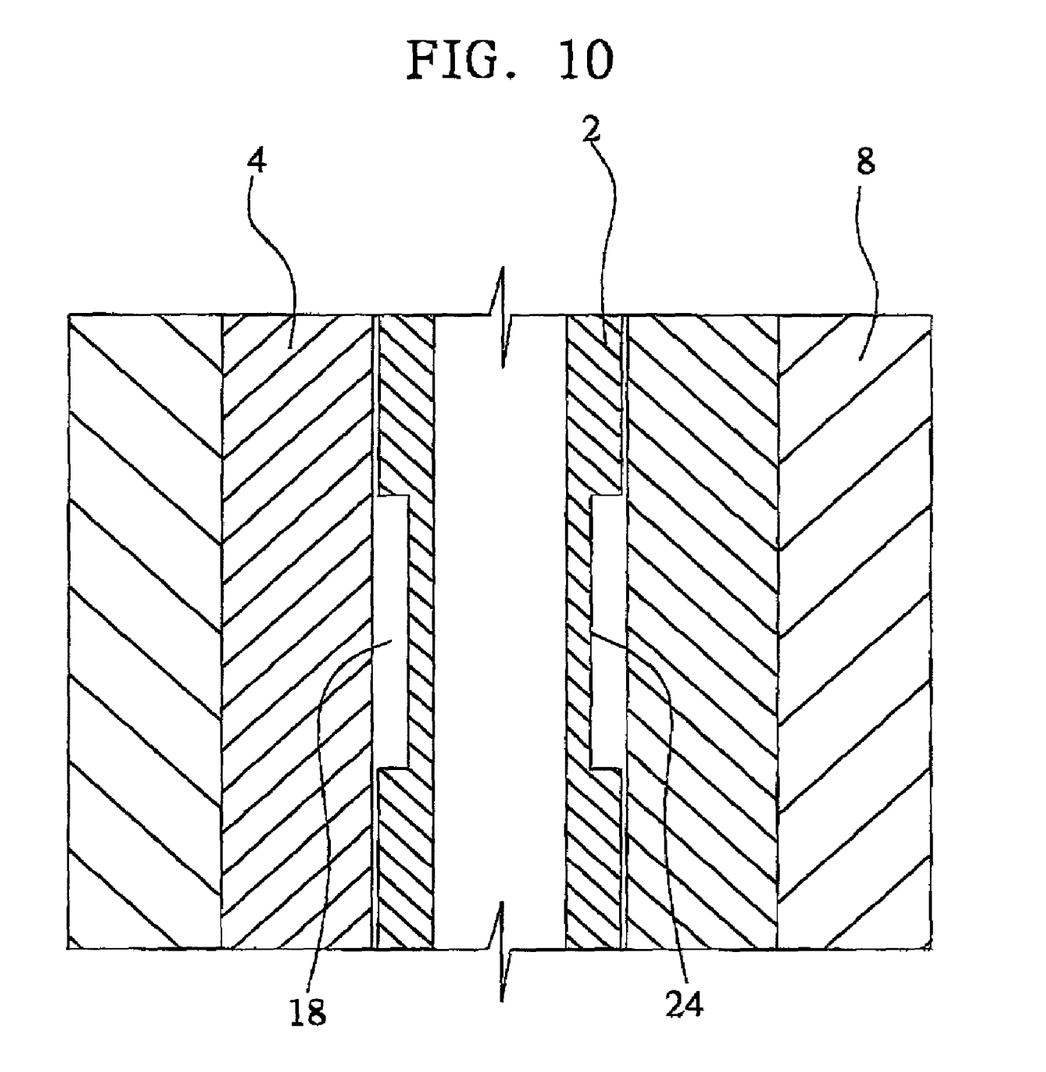
FIG. 10 is a schematic sectional diagram of the supporting device of a rotor according to the fourth alternative example of the invention.

FIG. 10 is a schematic sectional diagram of the supporting device of a rotor according to the fourth alternative example of the invention, wherein middle part of the ceramic axial tube 2a is formed with at least one ring concave 24 (only one is shown herein), and a concave space 18 of the ring concave 24 may be used for storing lubricants. This alterative example has same effects as the third alternative example on reducing frictional noise and heat production, and also on reducing frictional surface area and energy consumption.

In the above first to fourth alternative examples, a fluoride-containing lubricant with a particle diameter smaller then 1 µm may be used to provide good lubrication. Also, a quite low losing rate (consumption rate) of the lubricant may be expected when the spacing between the outside surface of the ceramic axial tube 2 and the inside surface of the ceramic axial support 4 is controlled within the range of 2–25 µm. Therefore, good lubrication for the supporting device of a rotor of the invention may be provided during the whole usage life if amount of lubricants stored in the ring space 16 or 18 of the axial tube 2 is properly controlled,

FIFTH ALTERNATIVE EXAMPLE

Figure 11:
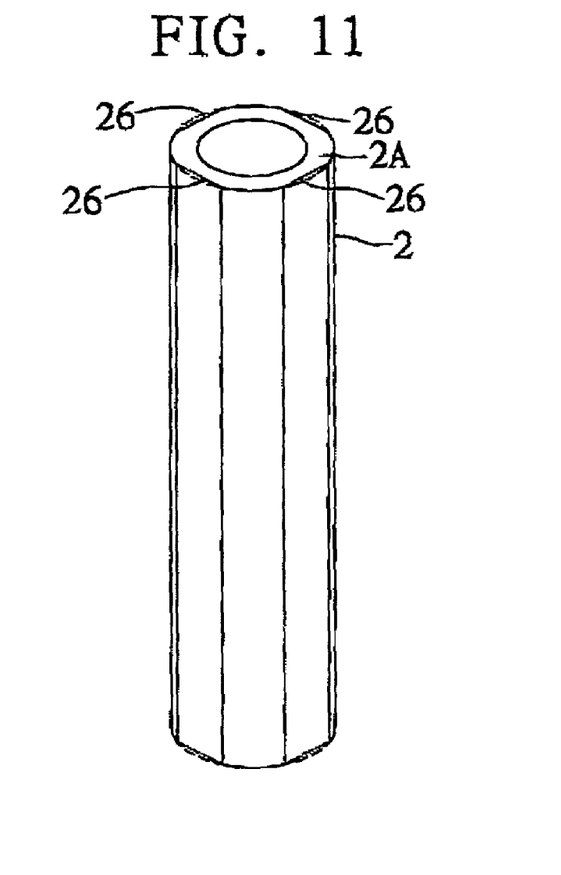
FIG. 11 is a schematic exploded diagram of the ceramic axial tube in the fifth alternative example of the invention.
Figure 12:
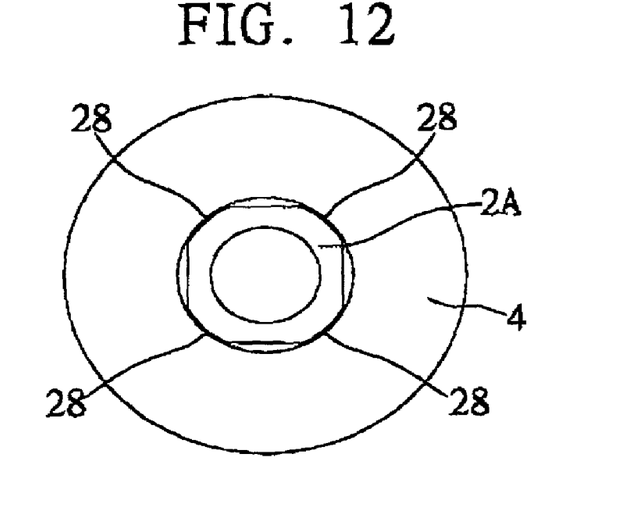
FIG. 12 is a schematic axial-view diagram of the supporting device of a rotor according to the fifth alternative example of the invention.

FIG. 11 is a schematic stereogram of the ceramic axial tube 2A in the fifth alternative example of the invention; FIG. 12 is a schematic axial-view diagram of the supporting device of a rotor according to the fifth alternative example of the invention. Referring to FIG. 11, the ceramic axial tube 2A is formed by axially cutting four arcs off from the circular ceramic axial tube 2 (shown as a dotted line) along a chord line 26. Wherein, any common conventional method in arts may be applied for cutting off the four arcs, for example, a method particular for cutting or grinding ceramic materials. After the above processing, the outer surface of the axial tube 2A becomes from an original cylindrical to a non-cylindrical shape as shown in FIG. 11, i.e. the axial sectional view of the axial tube 2A becomes from a circular to a square-like shape as shown in FIG. 12.

FIG. 12 represents a schematic axial-view diagram of the ceramic axial tube 2A of FIG. 11 surrounded by the ceramic axial support 4. Referring to FIG. 12, the axial tube 2A is rotationally contacted with the axial support 4 only by axial long-strip surfaces of slightly curved (nearly plane) arcs 28. Therefore, it may significantly reduce the rotational contact surface area so as to improve the effects on reducing frictional noise and heat production. Also, lubricants may not be required if the real-circularity and surface roughness are properly controlled and the spacing is maintained within the range of 2–25µm between the outer surface of the axial tube 2A and the inner surface of the axial support 4, due to the great reduction of the rotational contact area and frictional resistance thereof. In addition, better heat dissipation also can be achieved due to an easy access for gas entering into the space between the two arcs 28 of the axial tube 2A and the axial support 4.

Figure 13A:
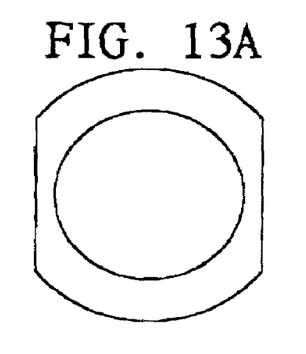
FIG. 13A is a schematic axial-view diagram for another example of the ceramic axial tube of the fifth alternative example.
Figure 13B:
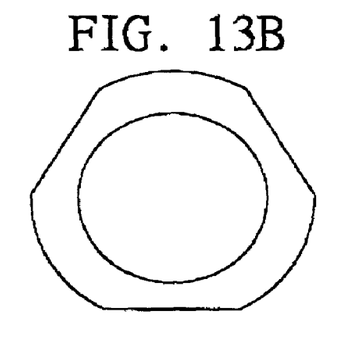
FIG. 13B is a schematic axial-view diagram for a further example of the ceramic axial tube of the fifth alternative example.
Figure 13C:
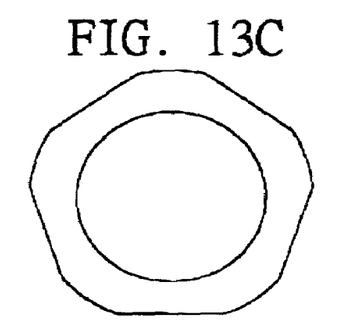
FIG. 13C is a schematic axial-view diagram for still another example of the ceramic axial tube of the fifth alternative example.
Figure 13D:
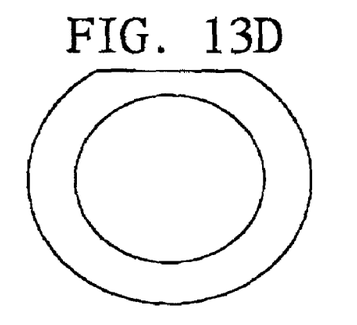
FIG. 13D is a schematic axial-view diagram for further another example of the ceramic axial tube of the fifth alternative example.

Wherein, the is no particular limitation on the width of the arc 28, except it can not be too small to damage the inside surface of the ceramic axial support 4. Further, FIG. 11 and FIG. 12 are exemplified by the ceramic axial tube 2A with a square-like axial view, but it is not limited to, the axial view may be any non-cylindrical shape, for example, an ellipse-like shape in FIG. 13A, an equivalent triangle-like shape in FIG. 13B, an equivalent pentagon-like shape in FIG. 13C and other equivalent multiangle-like shapes or a shape with only one arc being cut off as shown in FIG. 13D, etc.

Figure 14A:
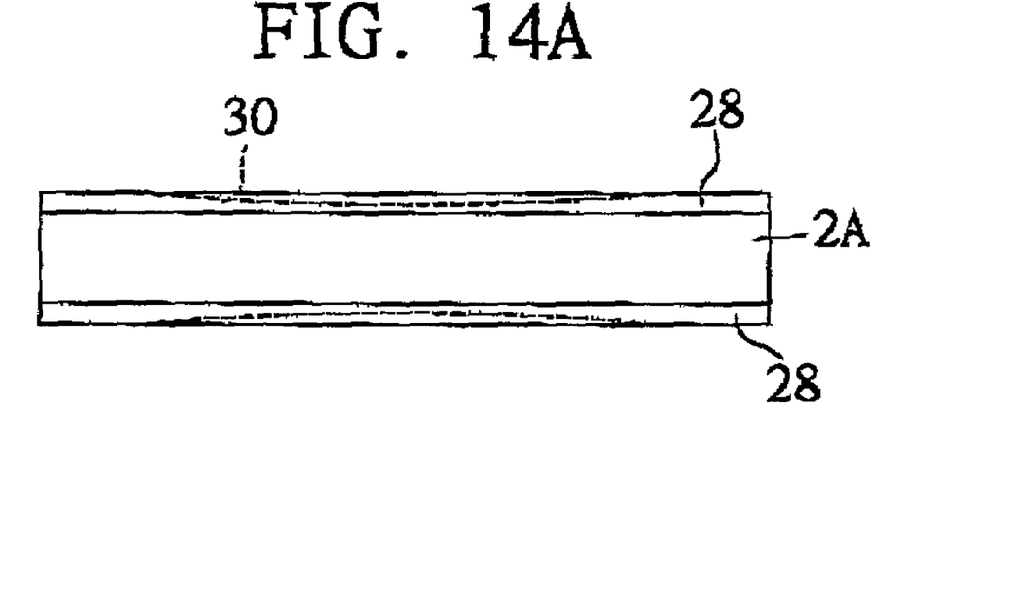
FIG. 14A is a schematic diagram for further cutting the ceramic axial tube along the cutting line as in FIG. 13.
Figure 14B:
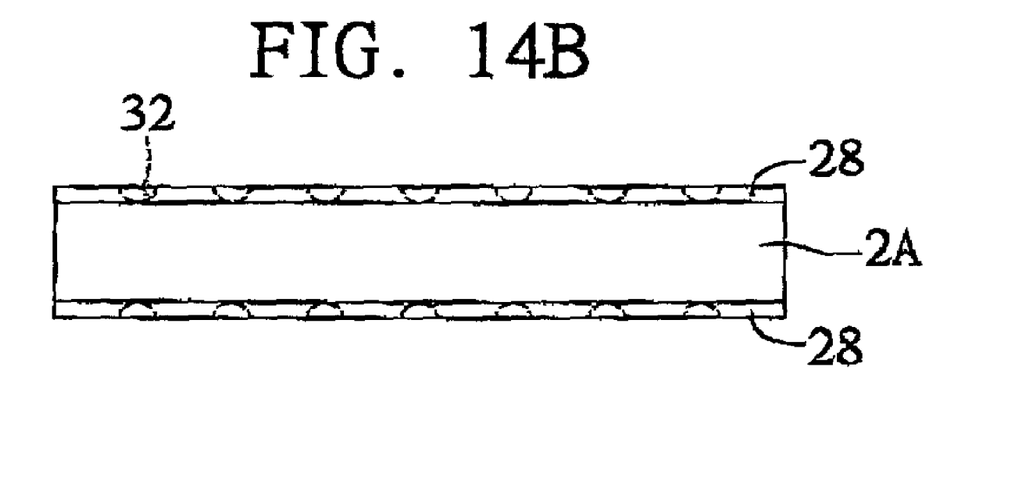
FIG. 14B is a schematic diagram for further cutting the ceramic axial tube in another way compared to FIG. 13.

Further, referring to FIG. 14A or FIG. 14B, cutting at the circumference direction may be applied to various shaped ceramic axial tubes 2A mentioned above to further reduce the contact surface area with the ceramic axial support. For example of the ceramic axial tube 2A in FIG. 11, surface of the original long-strip arc 28 may be reduced to two smaller areas by cutting a piece off from the axial tube 2A at circumference direction along the cutting line 30 (FIG. 14A), or reduced to more smaller areas by cutting the axial tube 2A at circumference direction along the cutting line 32 (FIG. 14B).

SIXTH ALTERNATIVE EXAMPLE

Figure 15:
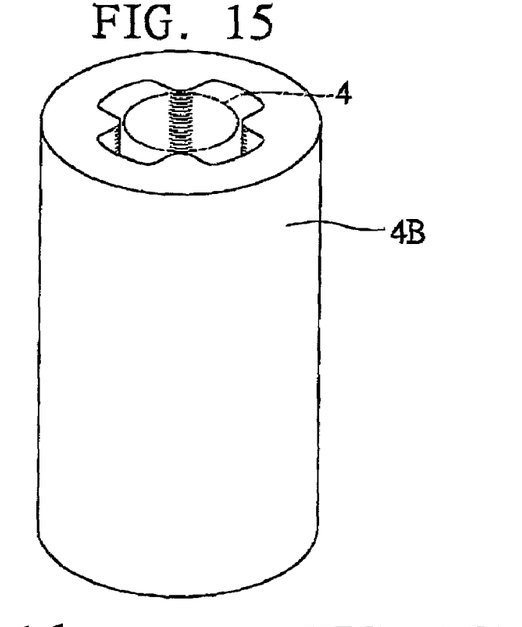
FIG. 15 is a schematic stereogram of the ceramic axial support in the sixth alternative example.
Figure 16:
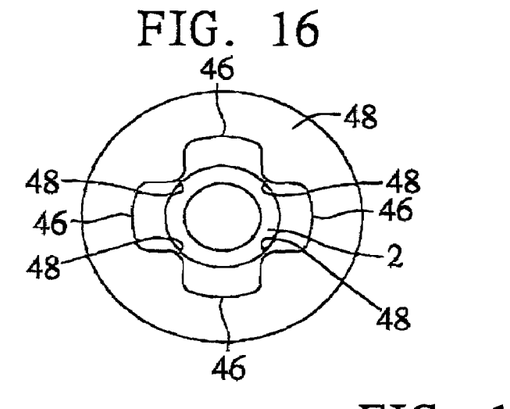
FIG. 16 is a schematic axial-view diagram of the supporting device of a rotor according to the sixth alternative example of the invention.

FIG. 15 is a schematic stereogram of the ceramic axial support 4B in the sixth alternative example; FIG. 16 is a schematic axial-view diagram of the supporting device of a rotor according to the sixth alternative example of the invention. Referring to FIG. 15, the ceramic axial support 4B is formed by cutting or grinding the inner surface of the ceramic axial tube 4 (shown as the dotted line) to form four axial concaves 46, wherein surfaces of the opposing convexes between the concaves 46 are processed to become circular arcs 48. After forming the above concaves, the inner surface of the axial support 4B becomes a non-cylindrical surface from an original circular surface, i.e. its axial view becomes a four-leaves flower shape as shown in FIG. 16 from an original circular shape FIG. 16 represents a schematic axial-view diagram of the ceramic axial support 4 of FIG. 15 inserted with the axial tube 2. Referring to FIG. 16, the ceramic axial support 4B is rotationally contacted with the ceramic axial tube 2 only by axial long-strip surfaces of slightly curved (nearly plane) arcs 48. Therefore, as in the fifth alternative example, it may significantly reduce the rotating contact surface to improve the effects on reducing frictional noise and heat production, and on heat-dissipation. In addition, lubricants may not be required similarly if the real-circularity and surface roughness are properly controlled and the spacing is maintained within the range of 2–25 µm between the outer surface of the axial tube 2A and the inner surface of the axial support 4B.

Figure 17A:
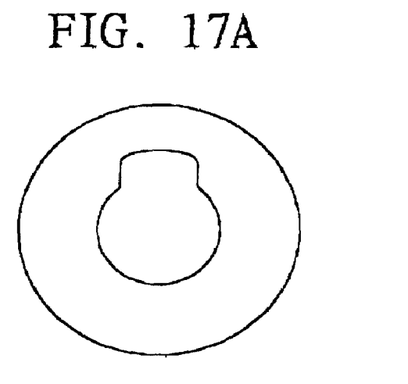
FIG. 17A is a schematic axial-view diagram for another example of the ceramic axial support of the sixth alternative example.
Figure 17B:
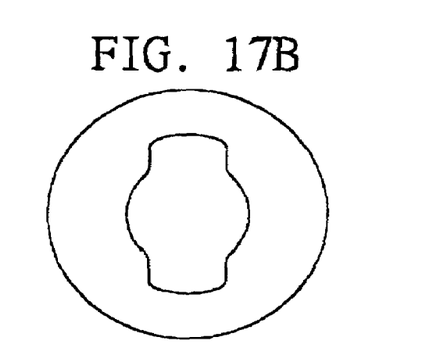
FIG. 17B is a schematic axial-view diagram for still another example of the ceramic axial support of the sixth alternative example.

Wherein, there is no particular limitation on the width of arc 48, except it may not be too small to damage the outer surface of the ceramic axial tube 2. Further, FIG. 15 and FIG. 16 are exemplified by the ceramic axial support 4B with a four-leaves flower-shape axial view, but it is not limited to, the axial view may be any non-cylindrical shape, e.g. a three-leaves, five-leaves or other multi-leaves flower shapes, or a shape with only one concave formed as shown in FIG. 17A and a shape with two concaves formed as shown in FIG. 17B, etc.

Therefore, compared with prior arts, advances of the invention may be concluded as follows:

(1) The axial tube of the rotation shaft of a rotor and the axial support for supporting the axial tube of the invention, made of ceramics with high mechanical strength, tolerance to high temperature and tolerance to abrasion, may increase the usage life of the supporting device of a rotor.

(2) The design of a hollow tube for the ceramic axial tube of the invention contributes to higher mechanical strength and higher resistance for breakage for the axial tube, which are advantageous for the fixing between the axial tube and the rotor.

(3) The invention allows the ceramic axial tube formed as a hollow tube with two end sealed to form an internal space for storing lubricants, and tiny slots or circular holes formed on the wall of the axial tube allow self-leakage of the stored lubricants to lubricate the opposing rotating surfaces of the axial tube and the ceramic axial support, which reduce frictional noise and heat production.

(4) The invention found by many experiments that the spacing between the ceramic axial tube and the ceramic axial support preferred to be within the range of 2–25 µm, and thus shaking and noise caused by spacing out of the range may be prevented.

(5) The ceramic axial tube may be contacted with the ceramic axial support by a small surface, which is formed by cutting off at least one piece from the outer surface of the axial tube or forming at least one concave on the inner surface of the axial support, and which is advantageous to prevent shaking, reduce noise, decrease heat production and improve heat dissipation, and to prolong the usage life of the supporting device of a rotor.

(6) Either the outer surface of ceramic axial tube or the inner surface of ceramic axial support is allowed to form a non-cylindrical surface, which reduces the rotational contact areas between the axial tube and the axial support, and reduces the amount of lubricants used. Experiments show that a rotor with such a structure may also rotate smoothly even if no lubricant is added.

The invention has been described using forgoing preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A supporting device of a rotor, which comprises:
    a ceramic axial tube which is a hollow tube with one end opening fixed on and closed by the rotor, and the other end opening closed by a lid, to allow a space formed within the ceramic axial tube to store lubricants;
    at least one ceramic axial support rotationally supporting the ceramic axial tube; and
    a permeable structure formed on the ceramic axial tube to allow the lubricants leaking out from inside of the ceramic axial tube.

2. The supporting device of the rotor of claim 1, wherein the rotor is a heat-dissipation fan.

3. The supporting device of the rotor of claim 1, wherein the spacing between the outer surface of the ceramic axial tube and the inner surface of the ceramic axial support is within the range of 2–25 μm.

4. The supporting device of the rotor of claim 1 wherein ceramic powders of a metal oxide selected from the group consisting of aluminum oxide, zirconium oxide, silicon oxide and a mixture thereof are used and uniformly formulated with a plastic agent, an assisting agent and a dispersing agent at a predetermined ratio.

5. The supporting device of the rotor of claim 1, wherein the permeable structure is a thin slot formed on the ceramic axial tube.

6. The supporting device of the rotor of claim 1, wherein the permeable structure is a hole formed on the ceramic axial tube.

7. The supporting device of the rotor of claim 1, wherein the lubricant is a fluoride-containing lubricant with a particle diameter smaller than 1 μm.

* * * * *